United States Patent [19]

Soreide et al.

[11] Patent Number: 4,818,101

[45] Date of Patent: Apr. 4, 1989

[54] LASER-DOPPLER VELOCIMETRY

[75] Inventors: David C. Soreide, Seattle; Gary D. Douglas, Renton, both of Wash.

[73] Assignee: The Boeing Company, Seattle, Wash.

[21] Appl. No.: 936,844

[22] Filed: Dec. 2, 1986

[51] Int. Cl.[4] .................... G01P 3/36; G01B 11/23; G01J 1/20

[52] U.S. Cl. .................... 356/28.5; 356/152; 250/201

[58] Field of Search .................... 356/28.5, 152; 250/201 R, 201 AF, 201 PF

[56] References Cited

U.S. PATENT DOCUMENTS

| | | |
|---|---|---|
| 3,360,987 | 1/1968 | Flower et al. |
| 3,382,758 | 5/1968 | Wang |
| 3,446,558 | 5/1969 | Seaton |
| 3,448,406 | 6/1969 | McClure |
| 3,531,204 | 9/1970 | Holland et al. |
| 3,532,427 | 10/1970 | Paine |
| 3,548,655 | 12/1970 | Rudd |
| 3,623,361 | 11/1971 | Funk, Jr. |
| 3,709,599 | 1/1973 | Iten |
| 3,723,004 | 3/1973 | Brayton ........................ 356/28.5 |
| 3,732,013 | 5/1973 | Heislmair et al. ............. 356/28.5 |
| 3,799,671 | 3/1974 | Schweizer ..................... 356/28 |
| 3,915,572 | 10/1975 | Orloff .......................... 356/28.5 |
| 4,102,572 | 7/1978 | O'Meara ....................... 356/5 |
| 4,201,467 | 5/1980 | Hartmann et al. ............. 356/28 |
| 4,281,540 | 8/1981 | Lee et al. |
| 4,346,994 | 8/1982 | Cruz ............................. 356/152 |
| 4,483,614 | 11/1984 | Rogers .......................... 356/28.5 |
| 4,576,480 | 3/1986 | Travis ........................... 356/152 |
| 4,618,759 | 10/1986 | Müller et al. .................. 356/152 |
| 4,627,725 | 12/1986 | Nishio et al. .................. 356/152 |

Primary Examiner—Stephen C. Buczinski
Assistant Examiner—Linda J. Wallace
Attorney, Agent, or Firm—Dellett, Smith-Hill and Bedell

[57] ABSTRACT

A laser-Doppler velocimeter, for measuring the velocity of particles passing a test location, comprises first and second lasers for providing a measurement laser beam directed along a first axis and a guide laser beam that is parallel to the measurement beam. The guide beam and the measurement beam are directed towards a beam deflecting mirror that reflects the measurement beam along a second axis and reflects the guide beam parallel to the second axis. The orientation of the second axis relative to the first axis depends on the orientation of the mirror, and the orientation of the mirror is controlled by an electrical adjustment mechanism. The measurement beam is received by a beam-dividing device that directs the measurement beam along a third axis towards the test location. Light scattered from particles at the test location focused on a collection aperture which is stationary relative to the beam-dividing device. The guide beam also is received by the beam-dividing device and is directed towards a photodetector. The photodetector is stationary relative to the beam-dividing device and generates an electrical signal representative of the orientation of the third axis relative to the beam-dividing device. The output signal of the photodetector is fed back to the adjustment mechanism so as to maintain the third axis at a constant orientation relative to the beam-dividing device. Consequently, the test location remains focused on the collection aperture when the beam-dividing device moves, e.g., due to vibration.

29 Claims, 2 Drawing Sheets

LASER-DOPPLER VELOCIMETRY

This invention relates to laser-Doppler velocimetry, particularly for use in wind tunnels.

BACKGROUND OF THE INVENTION

Laser-Doppler velocimetry is the technique whereby the velocity of a particle traversing a measurement region is measured by illuminating the measurement region with coherent light, collecting light scattered by the particle, and using interference effects to manifest the frequency shift in the scattered light due to the velocity of the particle.

Laser-Doppler anemometry is the application of laser-Doppler velocimetry to measurement of velocity of flow of a gas, and is described in F. Durst et al, *Principles and Practice of Laser-Doppler Anemometry*, Academic Press 1976. One of the methods described by Durst et al for carrying out a laser-Doppler anemometric measurement is referred to as the dual beam method. The dual beam concept may be implemented in a procedure that may be described as the off-axis, dual beam backscatter method. Two parallel beams of light from a laser are converged by a lens and caused to intersect in a measurement volume that lies in the flow of a gas that has small particles entrained therein. Light that is backscattered from the particles in the measurement volume is collected by a second lens that is off-axis with respect to the first-mentioned lens, and backscattered light waves originating from the two beams respectively interfere. If the solid angle from which the backscattered waves are collected is sufficiently small, a photodetector can be used to provide an output signal wherein the frequency is dependent on the velocity component of the particles along an axis that lies in the plane that contains the converging beams and is perpendicular to the bisector of the angle between the two converging beams.

Laser-Doppler anemometry has several advantages when applied to measurement of the velocity field in a wind tunnel. In particular, it is not necessary to introduce a physical measuring probe into the test section of the wind tunnel, and therefore the only effect of the measurement on the flow is due to the particles themselves. By appropriate selection of the particle size and density, the effect of the measurement technique on the flow is rendered substantially negligible. Moreover, since it is not necessary to introduce a physical probe into the test section, the position of the measurement volume can be changed without its being necessary to move any physical elements that are within the test section.

It is desirable that the lens used in the off-axis, dual beam backscatter method for converging the parallel beams on the measurement volume be close to the measurement volume, and therefore efforts to apply this method to measuring flow velocity in the test section of a trans-sonic wind tunnel have involved mounting the laser and associated optics in the plenum of the wind tunnel. The plenum of a trans-sonic wind tunnel is a hostile environment with respect to proper operation of a laser. For example, the pressure in the plenum may be as low as one-half of normal atmospheric pressure at sea level, and therefore arcing between the electrodes of the laser is liable to occur unless special steps are taken to prevent it. Moreover, at flow speeds of about Mach 1, severe vibrations occur, and the temperature in the plenum can be quite high (about 60° C). It has therefore been proposed that the lasers and associated optics be contained in a sealed, temperature-contorlled casing mounted in the plenum. However, this solution to the problem posed by the hostile environment in the plenum of a trans-sonic wind tunnel is subject to disadvantage since the casing is rather bulky and cannot readily be accommodated in the plenum.

It is an object of the present invention to provide an improved apparatus for accurately measuring wind tunnel velocity without requiring delicate instruments or the like to be placed in a hostile environment.

SUMMARY OF THE INVENTION

In a preferred embodiment of the present invention, a laser-Doppler velocimeter, for measuring the velocity of particles passing a test location, cmprises first and second laser for providing a measurement laser beam directed along a first axis and a guide laser beam that is parallel to the measurement beam. The guide beam and the measurement beam are directed towards a beam deflecting mirror that reflects the measurement beam along a second axis and reflects the guide beam parallel to the second axis. The orientation of the second axis relative to the first axis depends on the orientation of the mirror, and the orientation of the mirror is controlled by an electrical adjustment mechanism. The measurement beam is received by a beam-dividing device directing the measurement beam along a third axis towards the test location. Light scattered from particles at the test location is focused on a collection aperture which is stationary relative to the beam-dividing device. The guide beam also is received by the beam-dividing device and is directed towards a photodetector. The photodetector is stationary relative to the beam-dividing device and generates an electrical signal representative of the orientation of the third axis relative to the beam-dividing device. The output signal of the photodetector is fed back to the adjustment mechanism so as to maintain the third axis at a constant orientation relative to the beam-dividing device. Consequently, the test location remains focused on the collection aperture when the beam-dividing device moves, e.g. due to vibration.

The preferred embodiment of the invention may be applied to measurement of the flow velocity in a trans-sonic wind tunnel. The lasers and other delicate optical devices associated with providing suitable laser beams for laser-Doppler anemometry can be located outside the plenum of the wind tunnel. The beam-dividing device and the detector, which are not highly sensitive to vibration, high temperatures and low pressures, are located inside the plenum. The beam deflecting mirror may be located inside or outside the plenum.

BRIEF DESCRIPTION OF THE DRAWINGS

For a better understanding of the invention, and to show how the same may be carried into affect, reference will now be made, by way of example, to the accompanying drawings in which.

DETAILED DESCRIPTION

Figure 1:
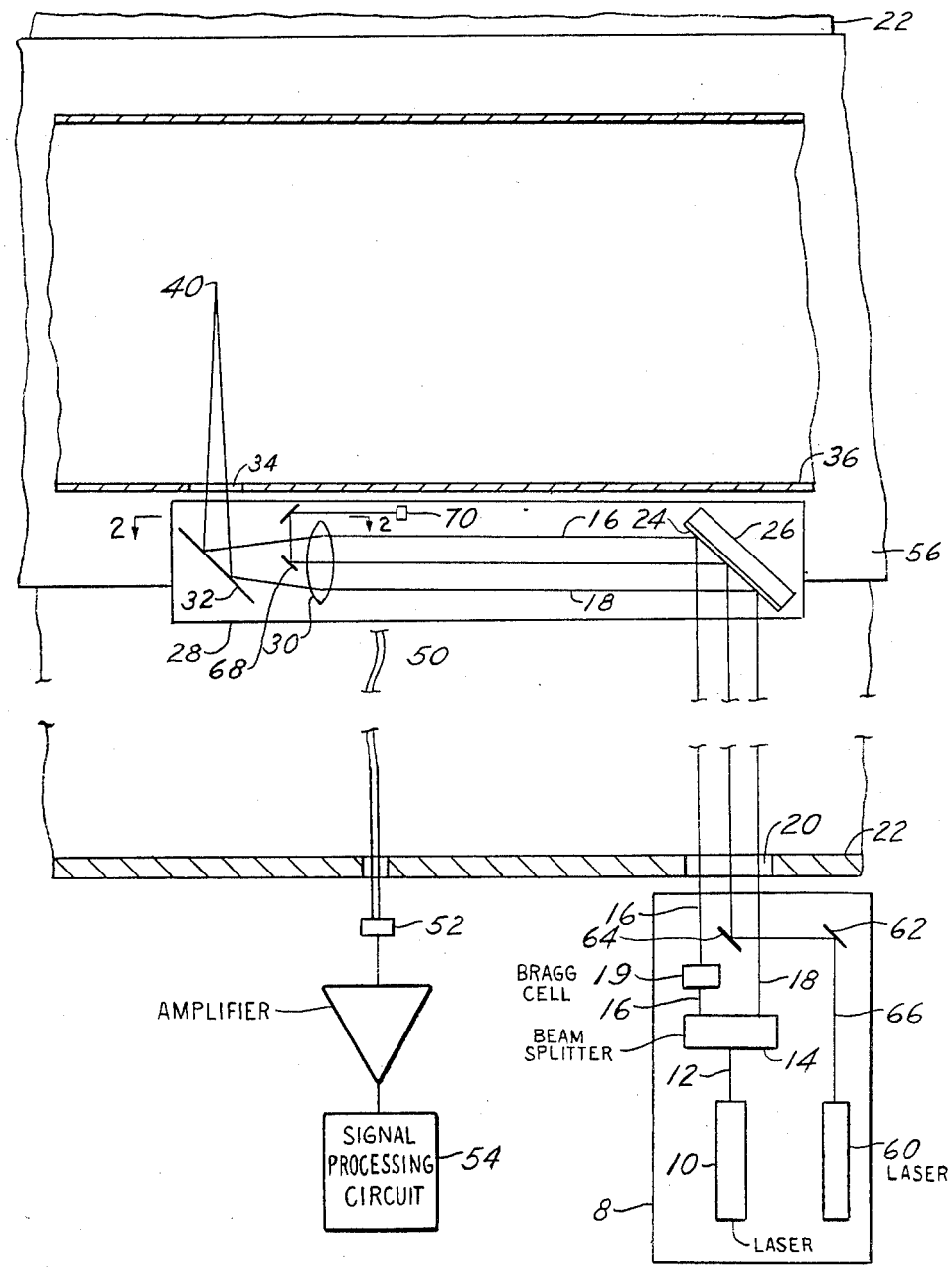
FIG. 1 is a horizontal sectional view through a portion of a trans-sonic wind tunnel equipped with a laser-Doppler anemometer embodying the present invention.

The laser-Doppler anemometer shown in FIG. 1 is used to implement the off-axis, dual beam backscatter method referred to above. The anemometer comprises a high power laser 10 which generates a continuous wave output laser beam 12. The beam 12 enters a beam splitter 14 by which it is divided into two separate output beams 16 and 18. The beam 16 passes through a Bragg cell 19 for shifting the frequency of the beam 16 by about 40 MHz. This change in frequency is sufficiently small whereby fringes can be observed when light waves from the beams 16 and 18 interfere, but whereby the fringes move across the field of view. The laser 10, the beam splitter 14 and the Bragg cell 19 are mounted on a stationary platform 8 outside the plenum of the wind tunnel. The beams 16 and 18 pass through a window 20, e.g. of float glass, in the wall 22 of the plenum and are incident on a mirror 24. The mirror 24 is mounted through a support 26 on a platform 28 that is adjacent the wall 36 of the test section of the wind tunnel. The mirror 24 reflects the beams 16 and 18 towards a converging lens 30 and a mirror 32. The lens 30 and the mirror 32 are mounted on the platform 28. The beams are reflected by the mirror 32 through a window 34 in the wall 36 and the lens 30 causes the beams 16 and 18 to converge and intersect at a measurement volume 40.

Figure 2:
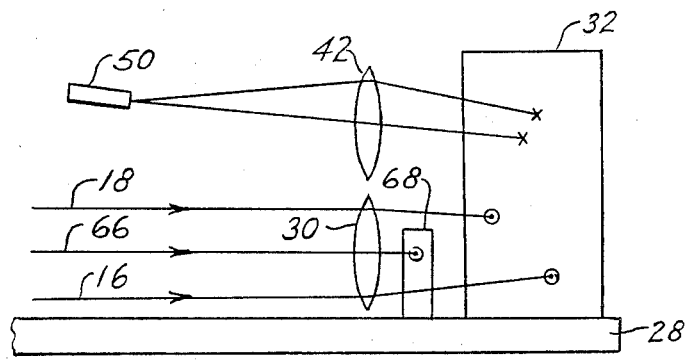
FIG. 2 is a view taken on the line 2—2 of FIG. 1, to an enlarged scale.

The air flow through the test section of the wind tunnel contains non-gaseous particles which cause scattering of the light incident thereon. The material and size of the particles depend on the nature of the flow that is to be measured. For example, oil drops that are 3-10 $\mu$m in diameter can be used for measuring a high speed (over Mach 1) flow which is of low vorticity. As particles pass through the measurement volume, light of both beams 16 and 18 is scattered by the particles, and some of the scattered light passes through the window 34 and is reflected by the mirror 32 into a lens 42 (FIG. 2) positioned vertically above the lens 30. The lens 42 images the measurement volume 40 on a collection aperture provided at the input end of an optical fiber 50. The input end of the optical fiber is mounted so as to be stationary relative to the lenses 30 and 42 and the mirror 32. The fiber 50 conducts the light received by way of the mirror 42 to a photomultiplier 52, the output signal of which is amplified and is processed in known fashion by a signal processing circuit 54 to generate a signal representative of the velocity component of the particles along an axis that lies in the plane that contains the beams 16 and 18 and is perpendicular to the bisector of the angle between the converging beams 16 and 18.

Preferably, the assembly of the lens 30, the mirror 32 and the input end of the optical fiber 50 is movable on the platform 28 in the longitudinal direction of the test section so as to allow the location of the measurement volume to be moved.

The platform 28 is mounted on a column (not shown) projecting into the plenum from the balance pit 56 of the wind tunnel. Even though the platform 28 is thereby mechanically isolated from the wall 36, it is still subject to vibration when the flow speed in the test section is about Mach 1 due to the extremely unstable conditions in the plenum. Vibration of the platform 28 may cause the angle of incidence of the measurement beam on the mirror 32 to change, such that the measurement volume is no longer focused by the lens 42 on the input face of the optical fiber 50.

In order to maintain the measurement volume 40 in conjugate relationship with the input face of the optical fiber 50, the mirror 24 is moved in a manner such as to compensate for movement of the mirror 32. Movement of the mirror 24 is controlled in dependence upon a guide beam generated by a low power laser 60. The laser 60 is mounted on the platform 8, and mirrors 62 and 64 are employed to fold the output beam 66 of the laser 60 whereby it is parallel to and intermediate the beams 16 and 18. The beam 66 therefore impinges on the mirror 24 and is reflected through the same angle as the beams 16 and 18 and passes through the lens 30 along its optical axis. Immediately downstream of the lens 30 is a further mirror 68 which intercepts the beam 66 and deflects it whereby it does not pass through the window 34 but is directed towards a PIN diode quadrant detector 70. The detector 70 is at the same optical distance as the measurement volume 40 from a point lying on the optical axis of the lens 30 and immediately downstream of the lens. In order to accommodate the necessary optical distance to the detector 70 in the geometrical dimensions of the platform 28, it can be necessary to fold the guide beam several times about the platform 28. The mirror 68 is positioned downstream of the lens 30 in order to ensure the guide beam passes through the same media as the measurement beams.

The quadrant detector is of known kind, e.g. a SPOT 9-D detector manufactured by United Detector Technology of Hawthorne, Calif., and provides an error signal representative of the position of the point of incidence of the beam 66 on the detector relative to the center of the detector. The error signal has components representative respectively of the vertical and horizontal distances of the point of incidence of the beam 66 from the center of the detector.

Figures 3, 4:
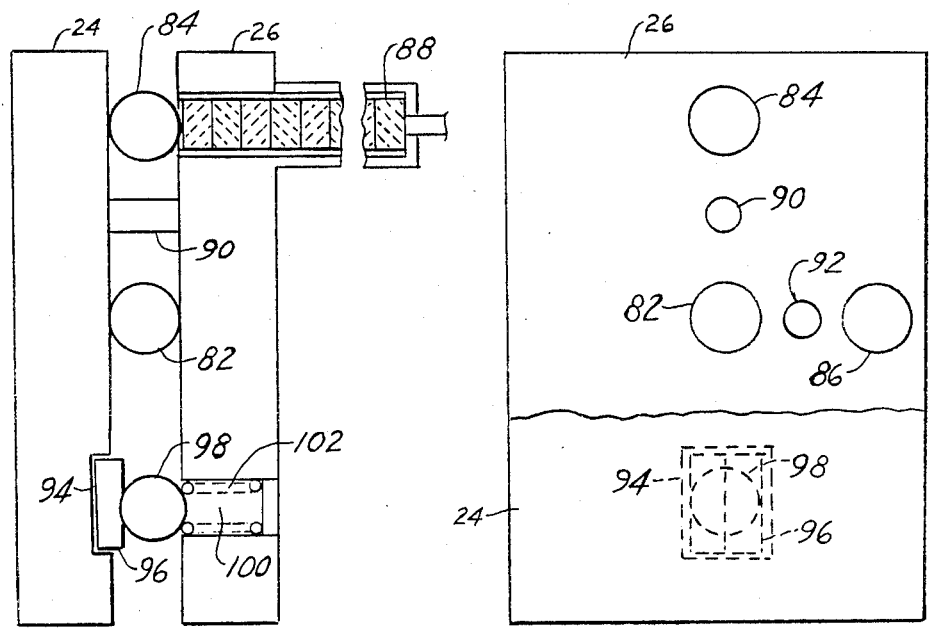
FIG. 3 is an enlarged side view of a beam-deflecting mirror.
FIG. 4 is a front elevation, partly cut away, of the beam-deflecting mirror.
Figure 5:
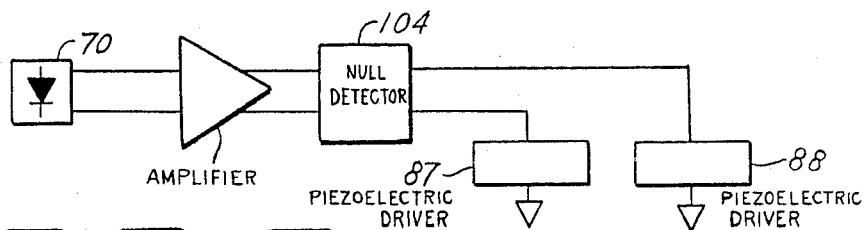
FIG. 5 is a simplified block diagram of a control circuit for bringing about adjustment of the orientation of the mirror.

As shown in FIG. 3, the back surface of the mirror is generally flat, and the front surface of the support 26 is generally flat. The mirror 24 is mounted on the support 26 in a manner permitting pivotal movement of the mirror relative to the platform 28 about vertical and horizontal axes that lie generally parallel to the front surface of the support. In particular, three balls 82, 84 and 86 project beyond the front surface of the support 26. The ball 82 is fixed relative to the support 26, whereas the balls 84 and 86, which are spaced horizontally and vertically respectively from the ball 82, are movable relative to the support by respective piezoelectric drivers 87 and 88, of which only one can be seen in FIG. 3. Tension springs 90 and 92 are each attached at one end to the front surface of the support and at the opposite end to the back surface of the mirror 24. The springs 90 and 92 are shown only schematically in FIGS. 3 and 4. The springs, are preferably very stiff steel leaf springs, located between the ball 82 and the balls 84 and 86 respectively. When a suitable voltage is applied to one of the piezoelectric drivers 87 or 88, the orientation of the mirror about a vertical or horizontal axis through the center of the ball 82 is changed.

The back surface of the mirror is formed with a groove 94 in which vertical rods 96 are positioned. A ball 98 projects from a bore 100 that is formed in the support 26 vertically below the ball 82 and is urged by a spring 102 into the cusp defined between the rods 96.

Engagement of the ball 98 in the cusp prevents rotation of the mirror about a horizontal axis through the center of the ball 82 and perpendicular to the axes of pivotal movement of the mirror.

The two components of the error signal generated by the detector 70 are amplified and applied to a null detector 104 which generates signals for driving the piezoelectric drivers and thereby adjusting the orientation of the mirror 24 relative to the platform 28 so as to keep the guide beam 66 centered on the photodetector 70. In this manner, the measurement volume defined by the intersection of the beams 16 and 18 will remain focused on the input face of the fiber 50 under vibration of the platform 28.

It will be appreciated the response time of the control loop containing the mirror 24, the detector 70 and the piezoelectric drivers must be less than the period of the vibrations of the platform 28. In an implementation of the invention it was found that most of the power in the vibrations is at a frequency of about 30 Hz and the maximum frequency at which there is significant power is below 50 Hz. In this case, the response time of the control loop should be 0.02 s.

As will be seen from the foregoing, the optical system for the laser-Doppler anemometer is divided into a delicate package mounted on the platform 8 and a hardy or rugged package mounted on the platform 28. The two packages are optically coupled by mirror 24. In this manner, components whose functions are adversely affected by the hostile environment in the plenum of the wind tunnel can be kept outside the plenum, and the directioning of the measurement beams is rendered immune to vibration taking place within the plenum.

It will be appreciated the present invention is not restricted to the particular embodiment that has been described and illustrated, and variations may be made therein without departing from the scope of the invention as defined in the appended claims and equivalents thereof. For example, the illustrated embodiment employs only two measurement laser beams and allows only one component of the velocity of the particles passing through hte measurement volume to be determined. If an additional pair of measurement laser beams, lying in a plane perpendicular to the beams 16 and 18, were employed, the velocity component in a second plane can be measured.

It is not essential for the movable mirror be mounted in the plenum of the wind tunnel. For example, the movable mirror could be mounted outside the plenum for directing the measurement and guide beams towards a stationary mirror mounted in the position shown for the mirror 24.

The invention is not restricted to use with the off-axis, dual beam backscatter method.

We claim:

1. Measurement apparatus for carrying out a measurement of a property at a test location, comprising:
   means for providing a measurement beam of electromagnetic radiation and a guide beam of electromagnetic radiation,
   a first beam deflector located to receive said beams and deflect the same,
   a second beam deflector for receiving the measurement beam and the guide beam and directing them towards the test location and a detection location respectively, the second beam deflector converging the measurement beam and the guide beam at the test location and the detection location respectively,
   collector means for collecting electromagnetic radiation from the test location,
   detector means at the detection location for receiving the guide beam and providing an output signal representative of the spatial relationship between the test location and the collector means, and
   feedback means effective between the detector means and the first beam deflector for adjusting beam orientation in such a manner as to maintain constant the spatial relationship between the test location and the collector means.

2. Measurement apparatus according to claim 1, wherein the second beam deflector comprises a converging lens which receives the measurement beam and the guide beam, a first reflector which receives the guide beam from the converging lens and reflects it towards the detector means, and a second reflector which receives the measurement beam from the converging lens and reflects it towards the test location.

3. Measurement apparatus according to claim 2, wherein the guide beam and the measurement beam received by the converging lens are collimated and the optical path length from the converging lens to the detector means is substantially the same as the optical path length from the converging lens to the test location.

4. Measurement apparatus according to claim 2, wherein the collector means are positioned to collect light from the test location, after reflection by the second reflector.

5. Measurement apparatus for carrying out a measurement of a property at a test location, comprising:
   means for providing a measurement beam of electromagnetic radiation and a guide beam of electromagnetic radiation and directing those beams parallel to one another,
   a first beam deflector located to receive said beams and deflect them so that they are directed parallel to an axis, the first beam deflector being operable to adjust selectively the orientation of said axis,
   a second beam deflector for receiving the measurement beam and the guide beam and directing them towards the test location and a detection location respectively, the second beam deflector converging the measurement beam and the guide beam at the test location and the detector location respectively,
   collector means stationary relative to the second beam deflector for collecting electromagnetic radiation from the test location,
   detector means that are at the detection location and are stationary relative to the second beam deflector and receive the guide beam and provide an output signal that is representative of the spatial relationship between the test location and the collector means, and
   feedback means effective between the detector means and the first beam deflector for adjusting the orientation of said axis in such a manner as to maintain constant the spatial relationship between the test location and the collector means.

6. Measurement apparatus according to claim 5, wherein the detector means have a detection surface and generate a signal representative of the position at which the guide beam is incident on the detection surface, and the second beam deflector directs the guide beam towards the detector means along a path that is substantially the same length as the path from the second beam deflector to the test location.

7. Measurement apparatus according to claim 5, wherein the means for providing the measurement beam and the guide beam are laser light sources and the first beam deflector is a mirror.

8. Measurement apparatus according to claim 7, wherein the second beam deflector comprises a converging lens that has an optical axis and is positioned to receive the measurement beam along a path that is parallel to and spaced from said optical axis and to receive the guide beam along said optical axis, and the second beam deflector also comprises a mirror for deflecting the guide beam towards the detector means.

9. Measurement apparatus according to claim 8, wherein the first-mentioned mirror is planar and is adjustable by pivoting about two mutually perpendicular axes which lie substantially parallel to the plane of the mirror, one of the axes of pivotal movement being perpendicular to the plane containing the first mentioned axis and the other axis of pivotal movement being parallel to said plane containing the first-mentioned axis.

10. Measurement apparatus according to claim 5, wherein the second beam deflector comprises a converging lens which receives the measurement beam and the guide beam, a first reflector which receives the guide beam from the converging lens and reflects it towards the detector means, and a second reflector which receives the measurement beam from the converging lens and reflects it towards the test location.

11. Measurement apparatus according to claim 10, wherein the guide beam and the measurement beam received by the converging lens are collimated and the optical path length from the converging lens to the detector means is substantially the same as the optical path length from the converging lens to the test location.

12. Measurement apparatus according to claim 10, wherein the collector means are positioned to collect light from the test location, after reflection by the second reflector.

13. Laser-Doppler anemometry apparatus, for measuring flow velocity in the test section of a wind tunnel, comprising:

laser means located outside the plenum of the wind tunnel for providing a measurement laser beam and a guide laser beam, said measurement laser beam and said guide laser beam being directed parallel to a first axis, a first beam deflector located for receiving said beams and deflecting them so that they are directed parallel to a second axis, the first beam deflector being operable to adjust selectively the orientation of the second axis, a second beam deflector mounted in the plenum of the wind tunnel for receiving the measurement beam and directing it towards a measurement location in the test section of the wind tunnel, collector means that are stationary relative to the second beam deflector for collecting light scattered from particles passing through the measurement location, detector means that are stationary relative to the second beam deflector for receiving the guide beam and providing an output signal that is representative of the spatial relationship between the measurement location and the collector means, and feedback means effective between the detector means and the first beam deflector for adjusting the orientation of the second axis in such a manner as to maintain constant the spatial relationship between the measurement location and the collector means.

14. Apparatus according to claim 13, wherein the first beam deflector is a mirror and is located in the plenum of the wind tunnel.

15. Apparatus according to claim 14, wherein the detector means have a detection surface and generate a signal representative of the position at which the guide beam is incident on the detection surface, and the second beam deflector receives the guide beam and directs the guide beam towards the detector means along a path that is substantially the same optical length as the path from the second beam deflector to the measurement location, the feedback means being effective to maintain stationary the point of incidence of the guide beam on the detection surface.

16. Apparatus according to claim 14, wherein the mirror is mounted for movement relative to a support member, said support member being stationary relative to the second beam deflector.

17. Apparatus according to claim 16, wherein the second beam deflector comprises a converging lens that has an optical axis and receives the measurement beam along an axis parallel to and spaced from said optical axis and receives the guide beam along said optical axis, and a reflector that is downstream of the lens for deflecting the guide beam towards the detector means without influencing the measurement beam.

18. Apparatus according to claim 13, wherein the second beam deflector receives the guide beam and directs it towards the detector means, the measurement beam and the guide beam being converged by the second beam deflector at the measurement location and the detector means respectively.

19. Apparatus according to claim 18, wherein the second beam deflector comprises a converging lens which receives the measurement beam and the guide beam, a first reflector which receives the guide beam from the converging lens and reflects it towards the detector means, and a second reflector which receives the measurement beam from the converging lens and reflects it towards the test location.

20. Apparatus according to claim 19, wherein the guide beam and the measurement beam received by the converging lens are collimated and the optical path length from the converging lens to the detector means is substantially the same as the optical path length from the converging lens to the test location.

21. Apparatus according to claim 19, wherein the collector means are positioned to collect light from the test location, after reflection by the second reflector.

22. Apparatus according to claim 13, wherein the first and second beam deflectors are located in the plenum of the wind tunnel, and the second beam deflector receives the guide beam and directs it towards detector means.

23. Apparatus according to claim 22, wherein the second beam deflector comprises a converging lens which converges the measurement beam at the measurement location and the guide beam at the detector means, a first reflector which receives the guide beam from the converging lens and reflects it towards the detector means, and a second reflector which receives the measurement beam from the converging lens and reflects it towards the test location, the detector means nad the collector means being located in the plenum of the wind tunnel, and the collector means being positioned to collect light from the test location, after reflection by the second reflector.

24. Laser-Doppler velocimetry apparatus, for measuring the velocity of particles passing a measurement location, comprising:
   laser means for providing a measurement laser beam and a guide laser beam,
   a first beam deflector located for receiving said beams and deflecting them so that they are directed parallel to an axis, the first beam deflector being operable to adjust selectively the orientation of said axis,
   a second beam deflector mounted for receiving the measurement beam and the guide beam and directing them towards the measurement location and a detection location respectively, the second beam deflector converging the measurement beam and the guide beam at the measurement location and the detection location respectively,
   collector means that are stationary relative to the second beam deflector for collecting light scattered from particles passing the measurement location,
   detector means at the detection location for receiving the guide beam and providing a signal that is representative of the spatial relationship between the measurement location and the collector means, and
   means for receiving said signal and for adjusting the orientation of said axis in such a manner as to maintain constant the spatial relationship between the measurement location and the collector means.

25. Apparatus according to claim 24, wherein the laser means provide first and second measurement beams that are directed parallel to one another and are received by the second beam deflector parallel to said axis, and said second beam deflector comprises a converging lens having an optical axis that is parallel to and spaced from said measurement beams, said lens being effective to converge said measurement beams at the measurement location.

26. Apparatus according to claim 24, wherein said means for providing said signal comprise a photodetector that is stationary relative to the second beam deflector, and the second beam deflector deflects light received from the laser means towards the photodetector.

27. Apparatus according to claim 24, wherein the second beam deflector comprises a converging lens which receives the measurement beam and the guide beam, a first reflector which receives the guide beam from the converging lens and reflects it towards the detector means, and a second reflector which receives the measurement beam from the converging lens and reflects it towards the test location.

28. Apparatus according to claim 27, wherein the guide beam and the measurement beam received by the converging lens are collimated and the optical path length from the converging lens to the detector means is substantially the same as the optical path length from the converging lens to the test location.

29. Apparatus according to claim 27, wherein the collector means are positioned to collect light from the test location, after reflection by the second reflector.

* * * * *